(12) United States Patent
Ikegaya et al.

(10) Patent No.: US 6,600,448 B2
(45) Date of Patent: Jul. 29, 2003

(54) FLAT-PLATE ANTENNA AND ELECTRIC APPARATUS WITH THE SAME

(75) Inventors: Morihiko Ikegaya, Ibaraki (JP); Takahiro Sugiyama, Ibaraki (JP); Hisashi Tate, Ibaraki (JP)

(73) Assignee: Hitachi Cable, Ltd., Tokyo (JP)

( * ) Notice: Subject to any disclaimer, the term of this patent is extended or adjusted under 35 U.S.C. 154(b) by 0 days.

(21) Appl. No.: 09/925,627

(22) Filed: Aug. 10, 2001

(65) Prior Publication Data

US 2002/0135525 A1 Sep. 26, 2002

(30) Foreign Application Priority Data

Mar. 23, 2001 (JP) ........................ 2001-085484
May 9, 2001 (JP) ........................ 2001-138361

(51) Int. Cl.[7] ........................ H01Q 1/38
(52) U.S. Cl. .................. 343/700 MS; 343/767; 343/830
(58) Field of Search .................. 343/700 MS, 702, 343/767, 829, 846, 848, 830

(56) References Cited

U.S. PATENT DOCUMENTS 5,245,349 A * 9/1993 Harada ................ 343/700 MS
5,291,210 A * 3/1994 Nakase ................ 343/700 MS
5,410,323 A * 4/1995 Kuroda ................ 343/700 MS
5,680,144 A * 10/1997 Sanad ................ 343/700 MS
5,835,063 A 11/1998 Brachat et al. ...... 343/700 MS

FOREIGN PATENT DOCUMENTS

| EP | 0749176 | 12/1996 |
| GB | 2345581 | 7/2000 |
| JP | 03-198295 | 7/1991 |
| WO | WO00/52784 | 9/2000 |

* cited by examiner

Primary Examiner—Don Wong
Assistant Examiner—Shih-Chao Chen
(74) Attorney, Agent, or Firm—Antonelli, Terry, Stout & Kraus, LLP

(57) ABSTRACT

Provided are a low-cost and high-performance antenna that can be placed in a small space inside a portable terminal or an electric appliance or housed in a wall or the like, and an electric apparatus having the antenna. A slit having a specified width and a specified length is formed in a conductive flat plate having a specified width and a specified length. A radiating element portion shaped like a monopole antenna and a ground portion (having a specified width) are formed with the slit between them. The width of the conductive flat plate (the length of the radiating element portion) is substantially a multiple of a quarter of a wavelength attained at the operating frequency of the antenna by an odd-numbered value.

16 Claims, 18 Drawing Sheets

FLAT-PLATE ANTENNA AND ELECTRIC APPARATUS WITH THE SAME

BACKGROUND OF THE INVENTION

1. Field of the Invention

The present invention relates to a compact and thin flat-plate antenna that is formed with a conductive flat plate, and readily housed in an electric apparatus such as a portable terminal or an electric appliance or in a wall or the like.

2. Prior Art

In recent years, various kinds of antennas dedicated to portable telephones or mobile computers (hereinafter, abbreviated as portable terminal in general) have become more and more compact except large-scale antennas for use at base stations or in satellite broadcasting. The antenna dedicated to the portable terminal is requested to be especially compact. Along with the tendency of the portable terminal toward a compact design, the antenna dedicated to the portable terminal is demanded to clear the problem of an installed space and to satisfy the demand for high performance despite limitations to the volume of the antenna. Moreover, when a wireless network is constructed at home as discussed in earnest recently, an antenna is required housed in the wall of a room or in a personal computer or any other electric appliance (hereinafter, abbreviated as electric appliance in general). In this case, the antenna has to clear the problem of its size.

The above problems are attributable to the fact that when it is intended to encase a dedicated antenna in the housing or casing (hereinafter, abbreviated as housing in general) of a portable terminal or an electric appliance, a dedicated space must be preserved inside the housing. Furthermore, when the electric appliance must be compact and lightweight, the antenna itself must also be less bulky and lightweight. In addition, the antenna must meet a demand for high performance. In other words, when an antenna offering high performance is placed in a housing, an installation space must be preserved inside the housing. Consequently, the specifications for the antenna having used heretofore must be modified. This leads to an increase in the cost of manufacturing and an extension of a development period. Therefore, for avoiding this problem, inmost cases, an external antenna is employed which is mounted using a separate housing or the like outside the housing through another cable or the like. However, in this method, when the portable terminal or electric appliance is moved, the external antenna must be often dismounted. Thereafter, the dismounted antenna must be remounted and readjusted. This is labor-intensive and time-consuming. At worst, the antenna may fail while the cable or the like are led to and fro or because of an unexpected trouble. Besides, the installed position of the portable terminal or electric appliance cannot be selected freely. This is discouraging to a user.

Consequently, a dedicated antenna housed in a portable terminal or each of home electric appliances that are interconnected over a wireless network at home is required to be easily adopted without concern about an increase in the cost of manufacturing and an extension of a development period. The antenna is also required to alleviate the user's labor. Furthermore, the antenna itself must be low-cost.

SUMMARY OF THE INVENTION

An object of the present invention is to provide a flat-plate antenna and an electric apparatus having the flat-plate antenna. The low-cost and high-performance flat-plate antenna can be placed in a limited space inside a portable terminal or an electric appliance or housed in a wall.

In order to solve the above problems, according to one aspect of the present invention, there is provided a flat-plate antenna having a slit, which has a specified width and a specified length, formed in a conductive flat plate. Horizontal portions of the conductive flat plate separated from each other with the slit between them serve as a radiating element portion and a ground portion respectively.

According to another aspect of the present invention, it is preferred that a separate radiating portion is electrically formed in a direction different from the length direction of the radiating element portion. The radiating portion includes as an integral part thereof a conductive portion that links the radiating element portion and ground portion. Power is radiated from the radiating element portion and radiating portion.

According to still another aspect of the present invention, the length of the radiating element portion and the length of the conductive flat plate are determined so that the flat-plate antenna will exhibit predetermined excitation and predetermined directivity.

According to still another aspect of the present invention, it is preferred that the length of the radiating element portion is differentiated from the width of the ground portion so that the flat-plate antenna will exhibit predetermined excitation and predetermined directivity.

According to still another aspect of the present invention, it is preferred that the length of the radiating element portion is substantially a multiple of a quarter of a wavelength attained at the operating frequency of the antenna by an odd-numbered value.

What is referred to as the operating frequency is an operating frequency at which the flat-plate antenna according to the present invention operates when housed in a certain housing and which depends on the position of the flat-plate antenna inside the housing. If the flat-plate antenna according to the present invention is housed in a wall or the like, the operating frequency depends on how the flat-plate antenna is housed.

The slitted shape of the flat-plate antenna may be varied depending on a power supply structure to be described later. Namely, the radiating element portion and ground portion may neither be parallel to each other nor be separated from each other by an even distance.

According to still another aspect of the present invention, a conductive line may be extended from part of the radiating element portion. The conductive line formed as an integral part of the radiating element portion may be used as part of a power line over which power is supplied to the antenna.

According to still another aspect of the present invention, a conductive line may be extended from part of the ground portion. The conductive line formed as an integral part of the ground portion may be used as part of a power line over which power is supplied to the antenna.

According to still another aspect of the present invention, a conductive plane formed on an insulating base may be adopted as the conductive flat plate.

The conductive plane is machined according to a method of plating the base or any other method.

According to still another aspect of the present invention, the conductive flat plate may have the shape thereof varied depending on the shape or situation of an installed position of the flat-plate antenna. For example, the conductive flat plate may have a three-dimensional shape, or may have part or the whole thereof streamlined.

According to still another aspect of the present invention, a power line over which power is supplied to the antenna may be brought into contact with the radiating element portion and the ground portion, and thus electrically coupled to the radiating element portion and the ground portion.

According to still another aspect of the present invention, a wiring pattern drawn on a substrate may be adopted as a power line over which power is supplied to the antenna. The power line may be electrically coupled to the radiating element portion and ground portion respectively.

A coaxial line composed of an inner conductor and an outer conductor may be adopted as a power line over which power is supplied to the antenna. The inner conductor is formed with a strand that includes a single wire or a plurality of wires. The outer conductor is mounted on the periphery of the inner conductor. The inner conductor and outer conductor bared at one end of the coaxial line may be coupled to the radiating element portion and ground portion respectively.

For connecting part of the radiating element portion to part of the ground portion using the inner conductor and outer conductor constituting the coaxial line, not only fusion using a conductive soldering material but also connection using connectors or the like may be adopted according to a purpose of use.

Preferably, a position on the radiating element portion at which the radiating element portion is coupled to the power line is determined in order to attain an impedance match. Moreover, a position on the ground portion at which the ground portion is coupled to the power line is determined in order to attain an impedance match.

Preferably, the above-described flat-plate antenna is placed inside an electric apparatus.

According to still another aspect of the present invention, a low-cost flat-plate antenna is so compact and thin that it can be placed in a space, which is as limited as a gap, inside a housing of a portable terminal or the like. The flat-plate antenna operates without exhibiting directivity with respect to the horizontal plane of the portable terminal or the like.

According to still another aspect of the present invention, when a separate antenna is located near the flat-plate antenna, the directivity of the antenna can be controlled while differentiated between the flat-plate antenna opposed to the separate antenna and the opposite portion thereof. Therefore, the electromagnetic interference will not occur. Moreover, a distance from the flat-plate antenna to the separate antenna can be reduced without impairment of the properties of the antenna.

DESCRIPTION OF THE PREFERRED EMBODIMENTS

Hereinafter, an embodiment of the present invention will be described in reference to the drawings.

The features of a flat-plate antenna according to the present invention will be described in reference to FIG. 1 and FIG. 2.

Figure 1:
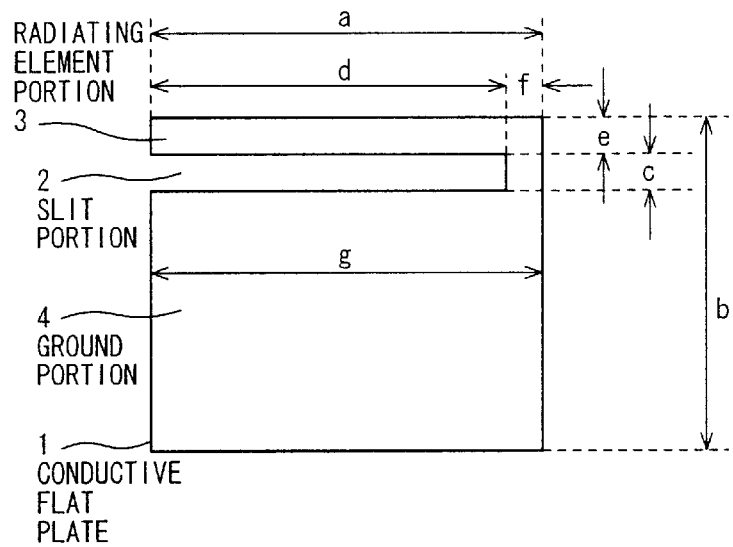
FIG. 1 shows the structure of a conductive flat plate employed in a flat-plate antenna according to the present invention.

A flat-plate antenna according to the present invention has, as shown in FIG. 1, a slit portion 2, which has a width c and a length d, formed in a conductive flat plate 1 that has a width a and a length b. A radiating element portion 3 shaped like a monopole antenna and a ground portion (of a width g) 4 are formed with the slit portion 2 between them. The width a of the conductive flat plate 1 (the length of the radiating element portion 3) is a multiple of a quarter of a wavelength attained at the operating frequency of the antenna by an odd-numbered value. The operating frequency is a frequency at which the flat-plate antenna according to the present invention operates while housed in an electric appliance, and which is determined with the dielectric materials made into the housing of the flat-plate antenna and the installed position of the flat-plate antenna dependent on the positions of the other conductive components. Moreover, the width c of the slit portion 2, the width e of the radiating element portion 3, and the width f of a conductive portion linking the radiating element portion 3 and ground portion 4 are determined based on the required properties of the antenna.

Figure 2:
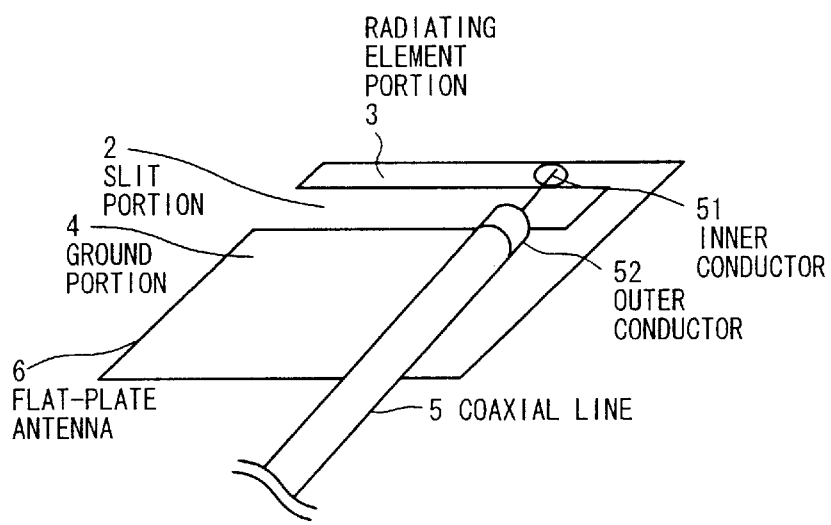
FIG. 2 shows the structure of the flat-plate antenna according to the present invention.

As shown in FIG. 2, an inner conductor 51 included in a coaxial line 5 is coupled to part of the radiating element portion 3. An outer conductor 52 included in the coaxial line 5 is coupled to part of the ground portion 4. Thus, a power supply structure is realized. The positions of the parts of the radiating element portion 3 and ground portion 4 are determined in order to attain an impedance match. The couplings may be achieved through fusion that is performed using a conductive soldering material, or using dedicated connectors or stays that are shaped to retain conductivity. As described in relation to examples later, the power supply structure is realized in different manners, that is, in a contact manner or a substrate mounted manner.

Figure 3:
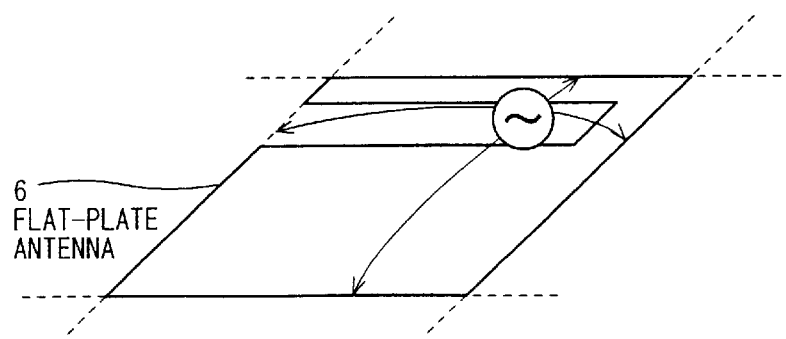
FIG. 3 shows the electrical structure of the flat-plate antenna according to the present invention.

Moreover, owing to the power supply structure shown in FIG. 3, a separate monopole antenna is electrically constructed in a direction substantially perpendicular to the length direction of the radiating element portion 3 that is structurally separated from the ground portion 4 with the slit portion 2 between them. The monopole antenna includes a radiating portion, of which length is approximately b, and passes through the conductive portion that has a width f and links the radiation element portion 3 and ground portion 4. The positions on the radiating element portion having the length a and on the ground portion having the length b are included in the power supply structure. An impedance match is attained at the positions. By changing the length b of the conductive flat plate 1 relative to the length a of the radiating element portion 3, the separate monopole antenna can be electrically formed in the direction substantially perpendicular to the length direction of the radiating element portion 3 so that the monopole antenna will pass through the conductive portion and has an impedance match attained therein.

For example, the length a of the radiating element portion is made equal to the length b of the conductive flat plate 1. This results in a flat-plate antenna 6 that exhibits excellent excitation and excellent directivity (brings about horizontal polarization and vertical polarization relative to an xy plane) as shown in FIGS. 4 and 5.

Figure 4:
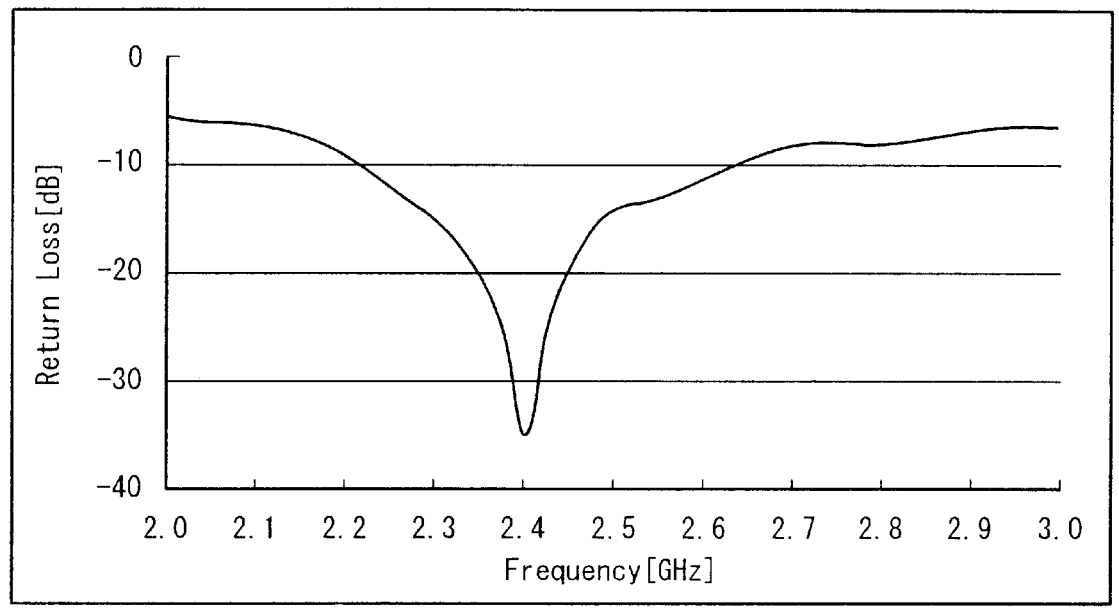
FIG. 4 shows the excitation of the flat-plate antenna according to the present invention.
Figure 5:
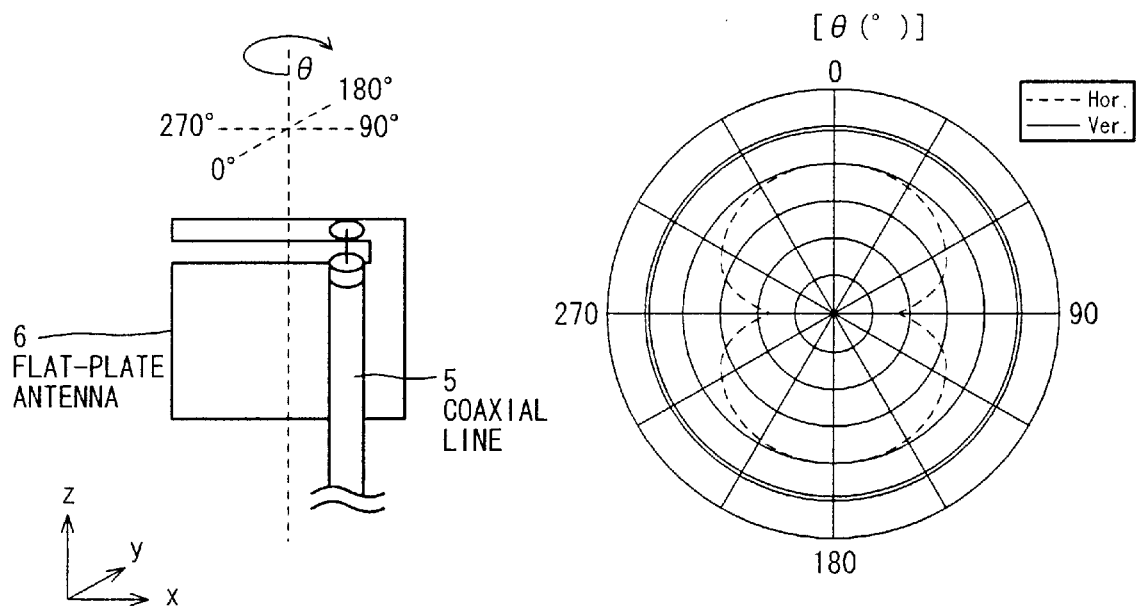
FIG. 5 shows the directivity of the flat-plate antenna according to the present invention.

Moreover, when the length b of the conductive flat plate 1 or the width g thereof is adjusted relative to the length a of the radiating element portion 3, the effective frequency band shown in FIG. 4 in which the flat-plate antenna is excited may be expanded. Besides, the directivity of the flat-plate antenna shown in FIG. 5 may be changed according to a purpose of use. The expansion or change will be detailed in reference to the examples of the present invention.

Moreover, one end of the coaxial line employed in the flat-plate antenna according to the present invention may be coupled to a power supply circuit or a relay circuit that is incorporated in an electric appliance in which the flat-plate antenna is housed. Thus, the coaxial line has the capability of a power line. This results in the compact and thin flat-plate antenna whose position can be selected freely.

Moreover, since the coaxial line is used as the power line, the power line can be led freely inside an electric appliance, in which the flat-plate antenna is placed, so that the power line will not interfere with the other components of the electric appliance. Besides, no restriction is imposed on the length of the power line.

As described above, according to the present invention, there is provided an antenna that does not require any drastic change in the specifications for a portable terminal or for each of home electric appliances that are interconnected over a wireless network at home. The specifications include the installed position of the home electric appliance or the installed positions of the components of the home electric appliance. Moreover, the low-cost high-performance antenna can be placed in a space that is so small as a gap created in a housing.

Moreover, when the flat-plate antenna is housed in a portable terminal or each of home electric appliances that are interconnected over a wireless network at home, even if the portable terminal or home electric appliance must be moved, it is unnecessary to dismount, remount or readjust an external antenna. Besides, the failure of the antenna caused by leading of a cable or the like or due to an unexpected trouble will not take place. A user is relieved from labor that has bothered a user. Furthermore, an installed position of an electric appliance can be freely selected from among a wider range of positions owing to excellent properties provided by the present invention.

Hereinafter, examples of the present invention will be described in reference to the drawings.

First Example

Figure 6:
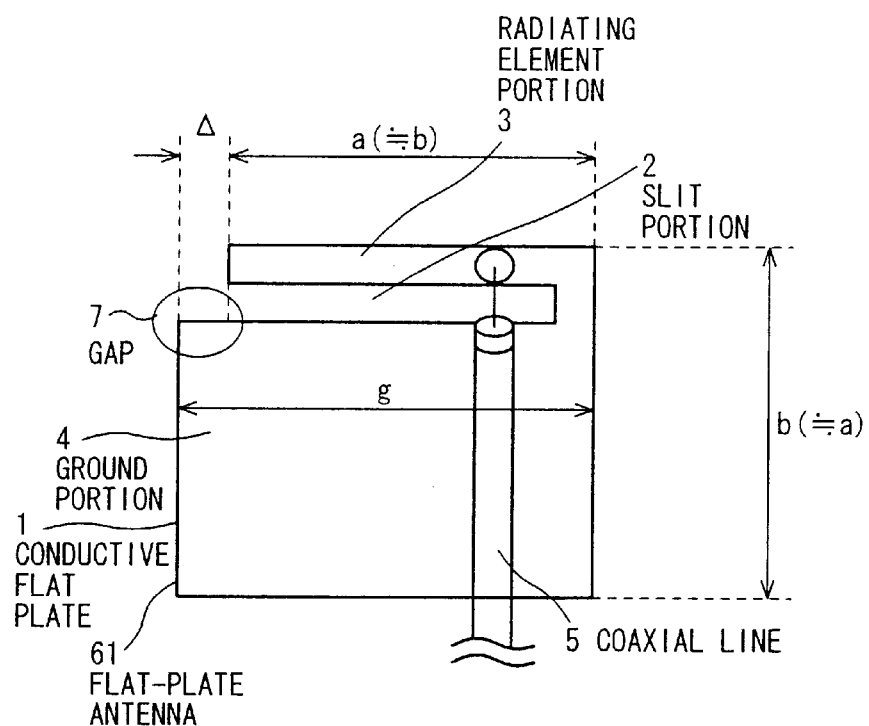
FIG. 6 shows the structure of a flat-plate antenna of a first example of the present invention.
Figure 7:
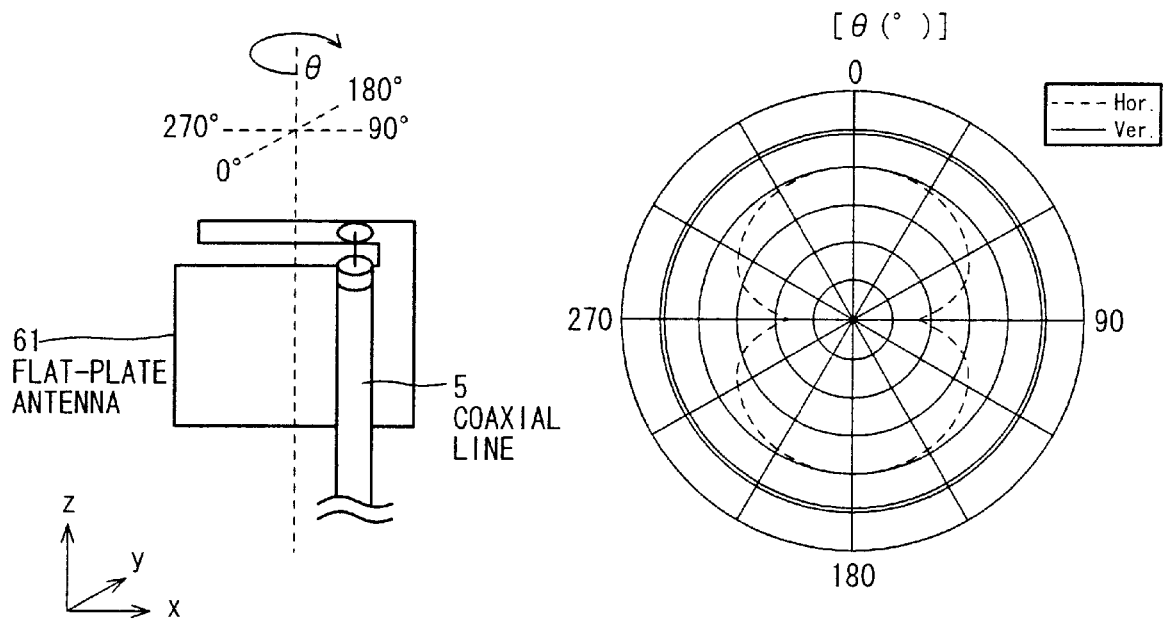
FIG. 7 shows the directivity of the flat-plate antenna of the first example of the present invention.
Figure 8:
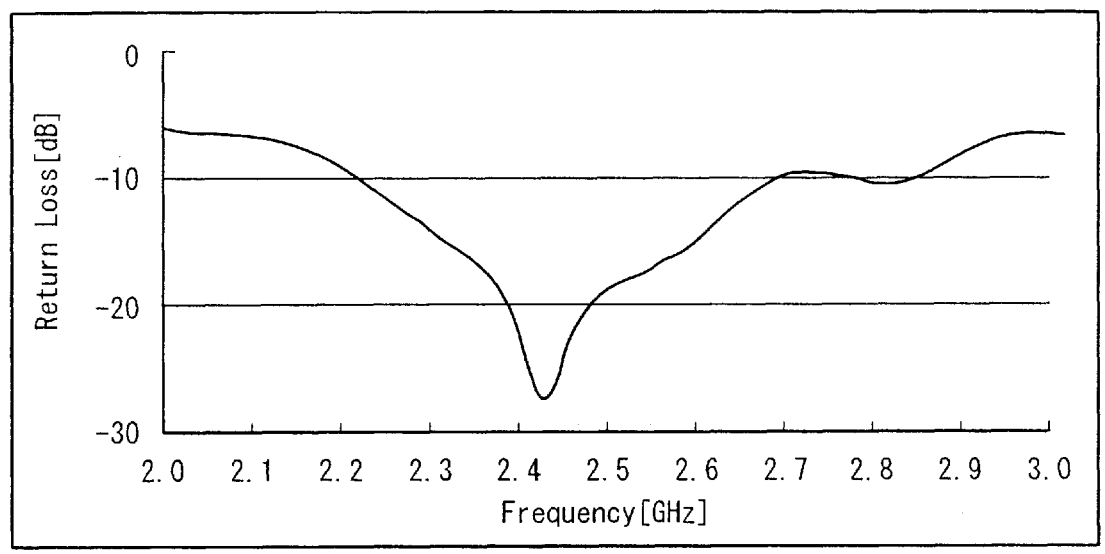
FIG. 8 shows the excitation of the flat-plate antenna of the first example of the present invention.

A first example of the present invention will be described in reference to FIGS. 6 to 8. FIG. 6 shows the structure of a flat-plate antenna 61 according to the present invention. Herein, the length a of a radiating element portion 3 of the flat-plate antenna 61 is equal to the length b of a conductive flat plate. The width g of a ground portion 4 of the flat-plate antenna 61 is larger than the length a of the radiating element portion 3. At this time, the length a of the radiating element portion 3 is nearly equal to a quarter of a wavelength attained at the operating frequency of the antenna. As shown in FIG. 6, there is a different portion 7, a difference Δ between the length a of the radiating element portion 3 and the width g of the ground portion 4. (In other words, there is a gap whose width equals the difference Δ below). Consequently, an electromagnetic field induced in a slit portion 2 changes its direction by a magnitude proportional to the width of the gap 7 for the purpose of attaining an impedance match. Therefore, the directivity of the antenna of this example shown in FIG. 7 is different from the one of the antenna, which does not have the gap 7, shown in FIG. 5. In other words, the antenna of this example exhibits directivity in the direction of the gap 7. Incidentally, the antenna of this example is excited in a frequency band shown in FIG. 8. The effective frequency band shown in FIG. 8 is much wider than that shown in FIG. 4. FIG. 8 demonstrates that the antenna of this example is excited highly efficiently. Moreover, when the width Δ of the gap 7 is changed, the antenna exhibit directivity in a direction different from the one shown in FIG. 7.

Second Example

Figure 9:
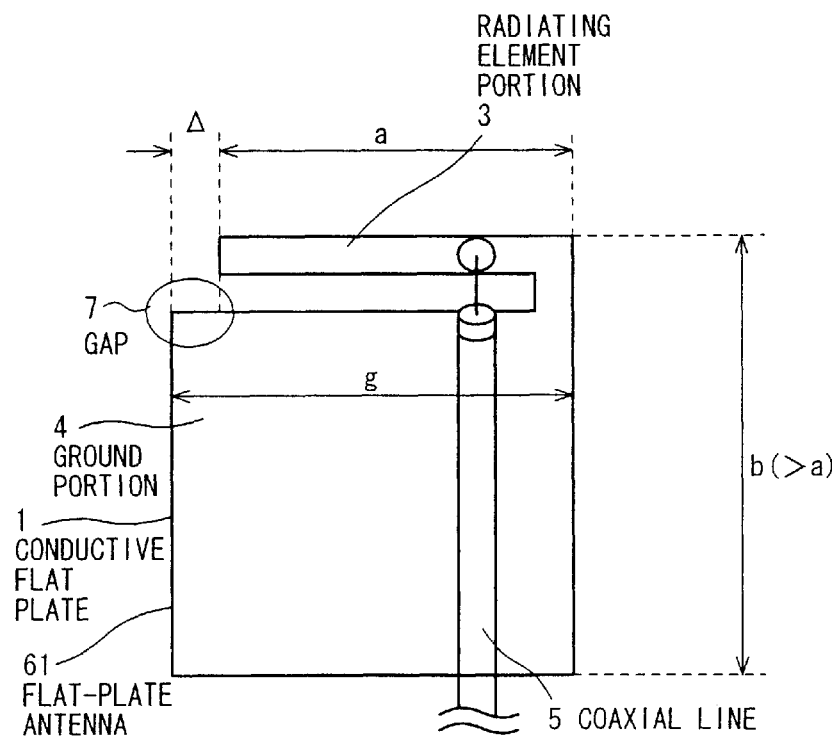
FIG. 9 shows the structure of a flat-plate antenna of a second example of the present invention.
Figure 10:
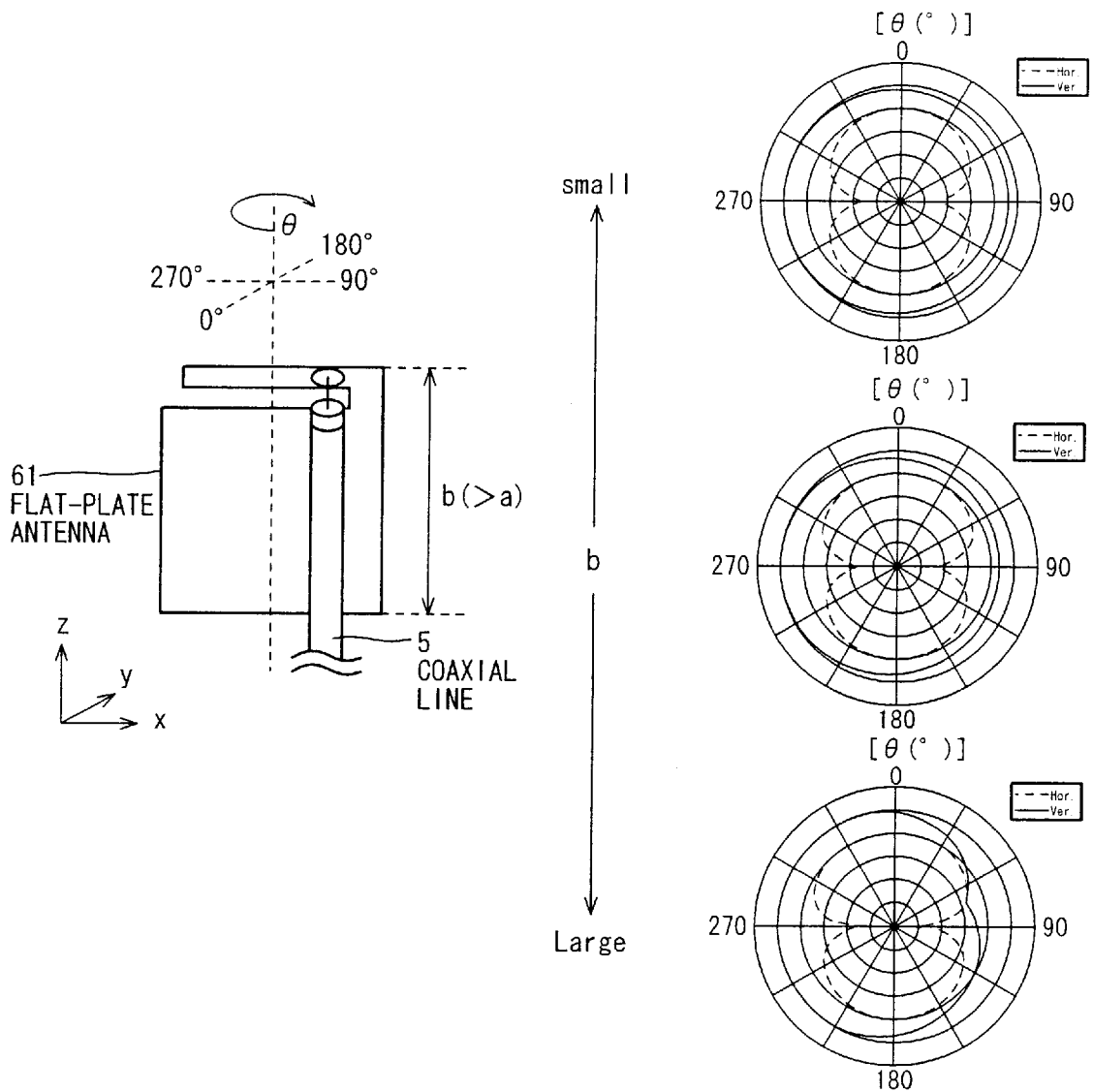
FIG. 10 shows the directivity of the flat-plate antenna of the second example of the present invention.

A second example of the present invention will be described in reference to FIGS. 9 and 10. FIG. 9 shows an example realized by fixing the width of the gap 7 of the first example to a certain value and changing the length b of the conductive flat plate 1 thereof. In this case, the standing-wave ratio of one separate monopole antenna varies with the change in the length b of the conductive flat plate 1. The separate monopole antenna is electrically formed in a direction substantially perpendicular to the length direction of the radiating element portion 3, and passes through the conductive portion linking the radiating element portion 3 and ground portion 4. The electromagnetic field that is induced in the slit portion 2 and has the direction thereof changed with the inclusion of the gap 7 further changes its direction with the variation of the standing-wave ratio. Consequently, as shown in FIG. 10, the antenna exhibits directivity in the direction of the gap 7 in the same manner as that in the first example. Furthermore, exhibition of the directivity in directions other than the direction of the gap 7 can be suppressed. In other words, the directivity of the antenna can be controlled by changing the length b of the conductive flat plate 1. Incidentally, the antenna is excited in as wide a frequency band as that in the first example. The graphical expression of the excitation is omitted.

Third Example

Figure 11:
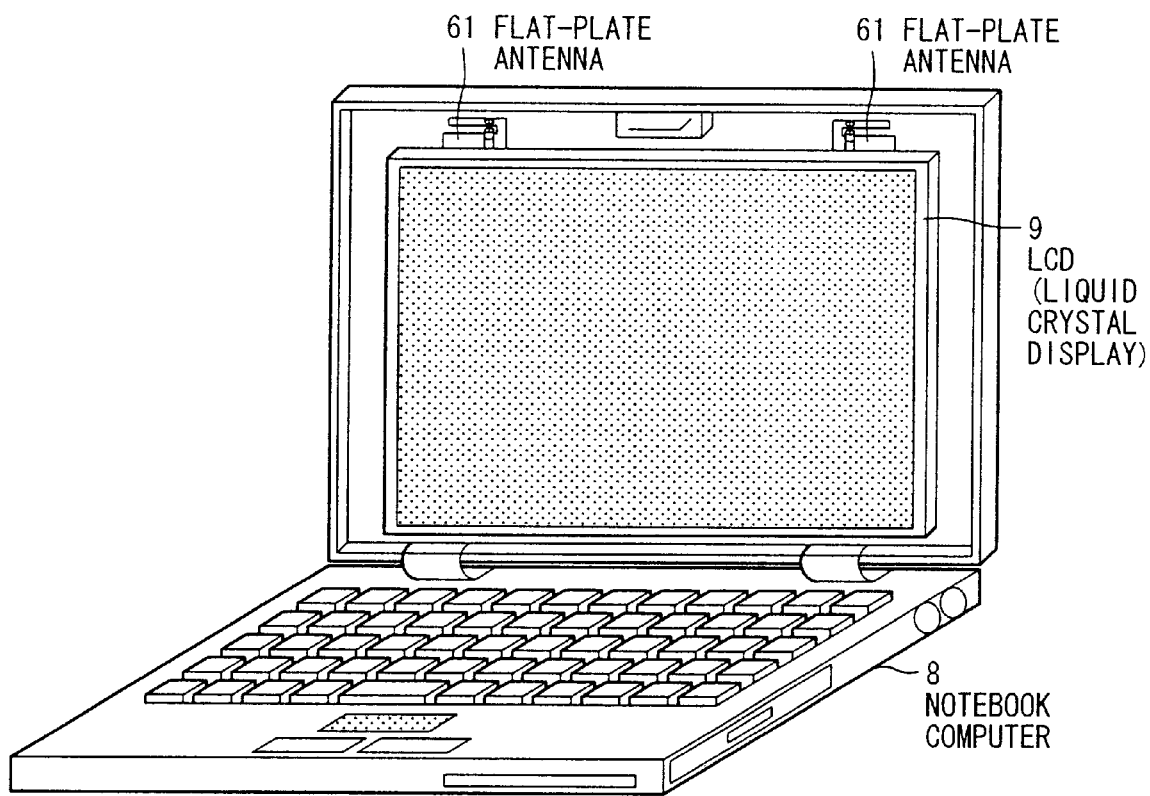
FIG. 11 is a conceptual diagram showing the appearance of a typical notebook computer in which a flat-plate antenna of a third example of the present invention is housed.

A third example of the present invention will be described in reference to FIGS. 11 and 12. FIG. 11 shows the appearance of a typical notebook-size personal computer 8 (hereinafter, abbreviated as notebook computer) having two flat-plate antennas 61 located above a liquid crystal display (LCD) thereof. The flat-plate antennas 61 are identical to the flat-plate antenna 61 of the first and second example except that the length b of the conductive flat plate 1 is larger. Referring to FIG. 11, the flat-plate antennas 61 are placed in a space created between the back of the LCD 9 of the notebook computer 8 and the wall of the housing of the notebook computer 8 in such a manner as described below. Namely, the radiating element portion 3 of each flat-plate antenna 61 is exposed above the LCD 9. The majority of the ground portion 4 is hidden behind the LCD 9. At this time, the flat-plate antennas 61 are fixed to the housing of the notebook computer 8 using an adhesive tape such as a cellophane adhesive tape or a double-sided adhesive tape, or using a dedicated fixture. Furthermore, the coaxial line used as the power line should have a small diameter so that the coaxial line can be led through the small space. Like the flat-plate antennas 61 according to the present invention, the coaxial line is led through the small space between the back of the LCD 9 and the housing of the notebook computer 8. The dimensions of the flat-plate antennas 61 according to the present invention are determined in consideration of the dielectric constants of various materials made into the housing of the notebook computer 8 and the influence of the conductive components of the LCD 9. At this time, the operating frequency of the antennas attained when the antennas are actually housed in the notebook computer is also taken into consideration. Furthermore, the antennas must be able to be excited efficiently.

Figure 12:
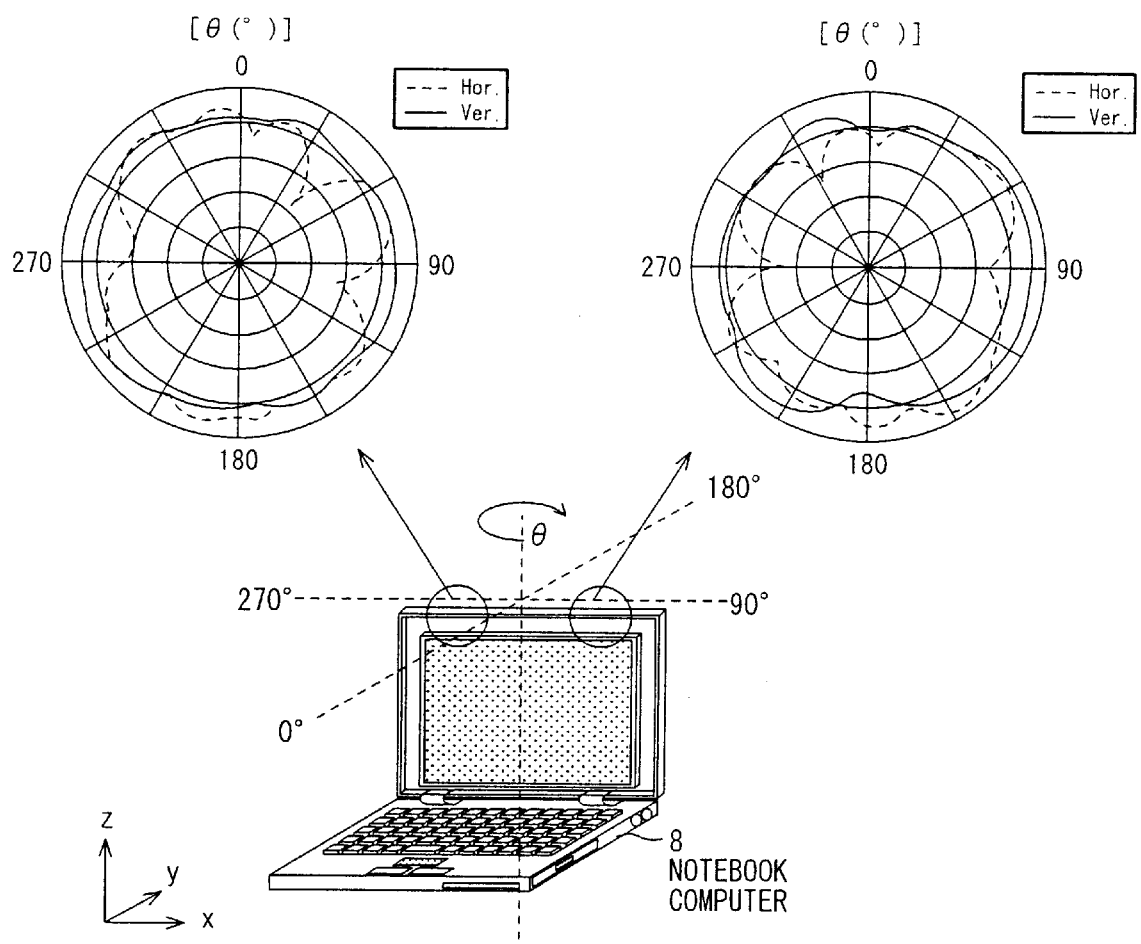
FIG. 12 shows the directivity of the flat-plate antenna of the third example of the present invention that is housed in the typical notebook computer.

Next, FIG. 12 shows the measures of the directivities of the flat-plate antennas 61 according to the present invention. FIG. 12 demonstrates that the flat-plate antennas 61 bring about both horizontal polarization and vertical polarization. Moreover, FIG. 12 demonstrates that the flat-plate antennas 61 according to the present invention exhibit excellent directivities, which are symmetric to each other just like a reflection of the arrangement of the flat-plate antennas 61, with respect to the horizontal plane (xy plane) of the notebook computer. The directivities are different from the directivity shown in FIG. 5 or the like due to the influences of the dielectric materials made into the housing of the notebook computer 8 and the conductive components of the LCD 9 or the like. However, the directivities are acceptable for a wireless LAN or the like. Incidentally, the sides of the flat-plate antennas 61 to which the coaxial lines 5 are coupled may be opposed to the wall of the housing behind the LCD 9 of the notebook computer 8. Furthermore, in order to block direct conduction of electricity between the flat-plate antennas 61 according to the present invention and the LCD 9 or the like, the flat-plate antennas 61 may be entirely wrapped with an insulating film made of a laminate material or the like.

Fourth Example

Figure 13:
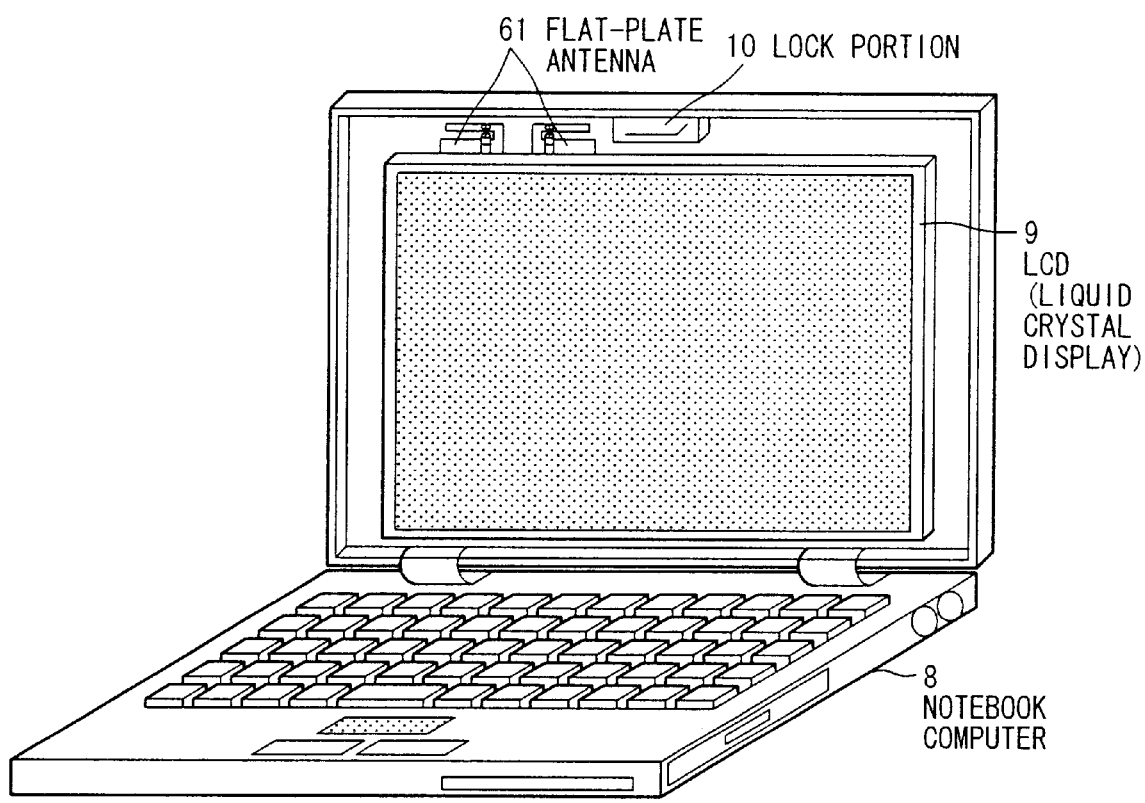
FIG. 13 is a conceptual diagram showing the appearance of a typical notebook computer in which a flat-plate antenna of a fourth example of the present invention is housed.

A fourth example of the present invention will be described in reference to FIGS. 13 and 14. FIG. 13 shows the appearance of a notebook computer having the flat-plate antennas 61 of the third example of the present invention housed therein. The flat-plate antennas 61 according to the present invention exhibit directivities in specified directions like the flat-plate antennas of the first and second examples. Thus, exhibition of directivities in directions other than the specified directions is suppressed. Even when the plurality of flat-plate antennas 61 according to the present invention is placed adjacently to each other, electromagnetic interference occurring between adjoining antennas is suppressed. The flat-plate antennas 61 can therefore be placed adjacently to each other with a smaller distance between them than ordinary antennas are. Consequently, the flat-plate antennas 61 can be placed in such a limited space as shown in FIG. 13.

Figure 14:
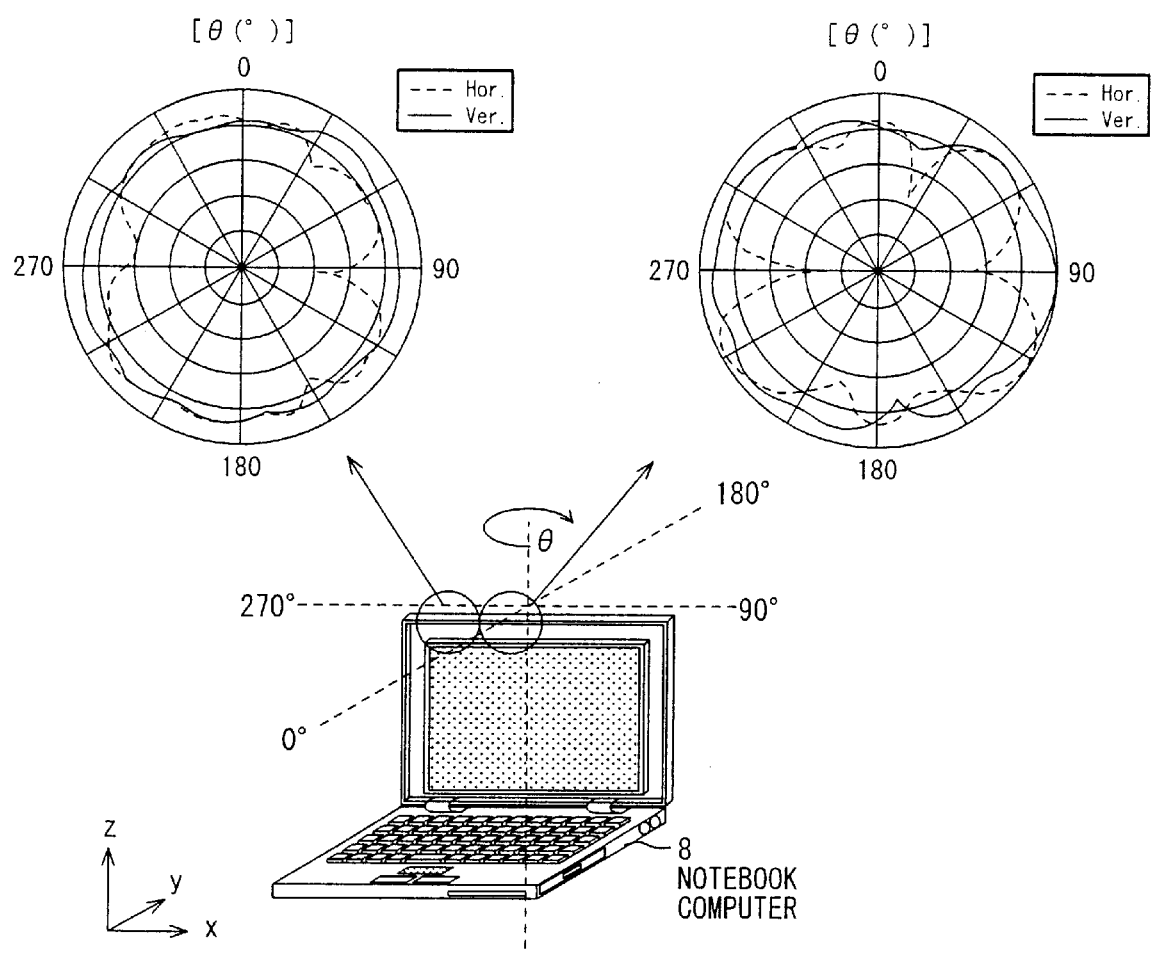
FIG. 14 shows the directivity of the flat-plate antenna of the fourth example of the present invention that is housed in the typical notebook computer.

FIG. 14 shows the measures of directivities actually exhibited by the flat-plate antennas 61 according to the present invention that are housed adjacently to each other in the notebook computer 8 as shown in FIG. 13. As apparent from FIG. 14, the flat-plate antennas 61 of even this example exhibit excellent directivities. However, unlike the directivities of the flat-plate antennas 61 of the third example, the directivities are not symmetrical to each other just like a reflection of the positions of the flat-plate antennas 61. This is attributable to the presence of a lock portion 10 that locks the LCD 9 when the LCD 9 is closed and that is, as shown in FIG. 13, located in the upper part of the LCD 9 of the notebook computer 8.

Fifth Example

Figure 15:
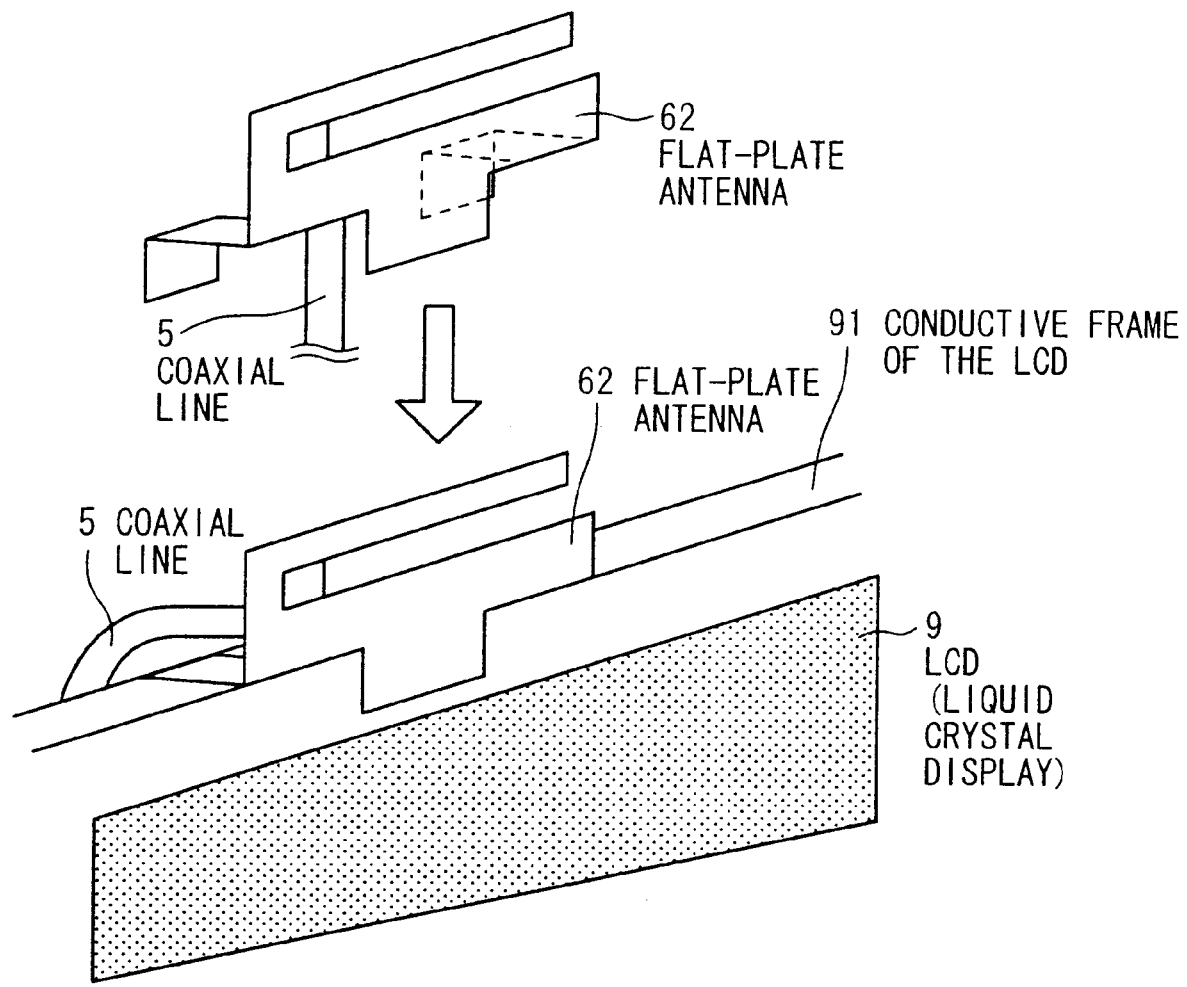
FIG. 15 is a perspective view of a flat-plate antenna of a fifth example of the present invention.

A fifth example of the present invention will be described in reference to FIGS. 15 and 16. FIG. 15 shows the appearance of a flat-plate antenna 62 and the actually housed state of the flat-plate antenna 62. The flat-plate antenna 62 is realized by deforming the ground portion of the flat-plate antenna 61 of the first or second example of the present invention. Specifically, the ground portion of the flat-plate antenna 61 is deformed so that the flat-plate antenna 61 can be directly housed in a conductive frame 91, which is formed with a conductor, of the LCD 9 of the notebook computer 8. This structure is intended to allow the conductive frame 91 of the LCD, which is formed with a conductor, to act as a ground. Even in this example, similarly to the third and fourth examples, the dimensions of the flat-plate antenna 62 are determined in consideration of the dielectric constants of various materials made into the housing of the notebook computer 8 and the influence of the conductive components of the LCD 9. Moreover, an operating frequency at which the flat-plate antenna operates when housed actually is taken into consideration. Furthermore, the flat-plate antenna is excited efficiently.

Figure 16:
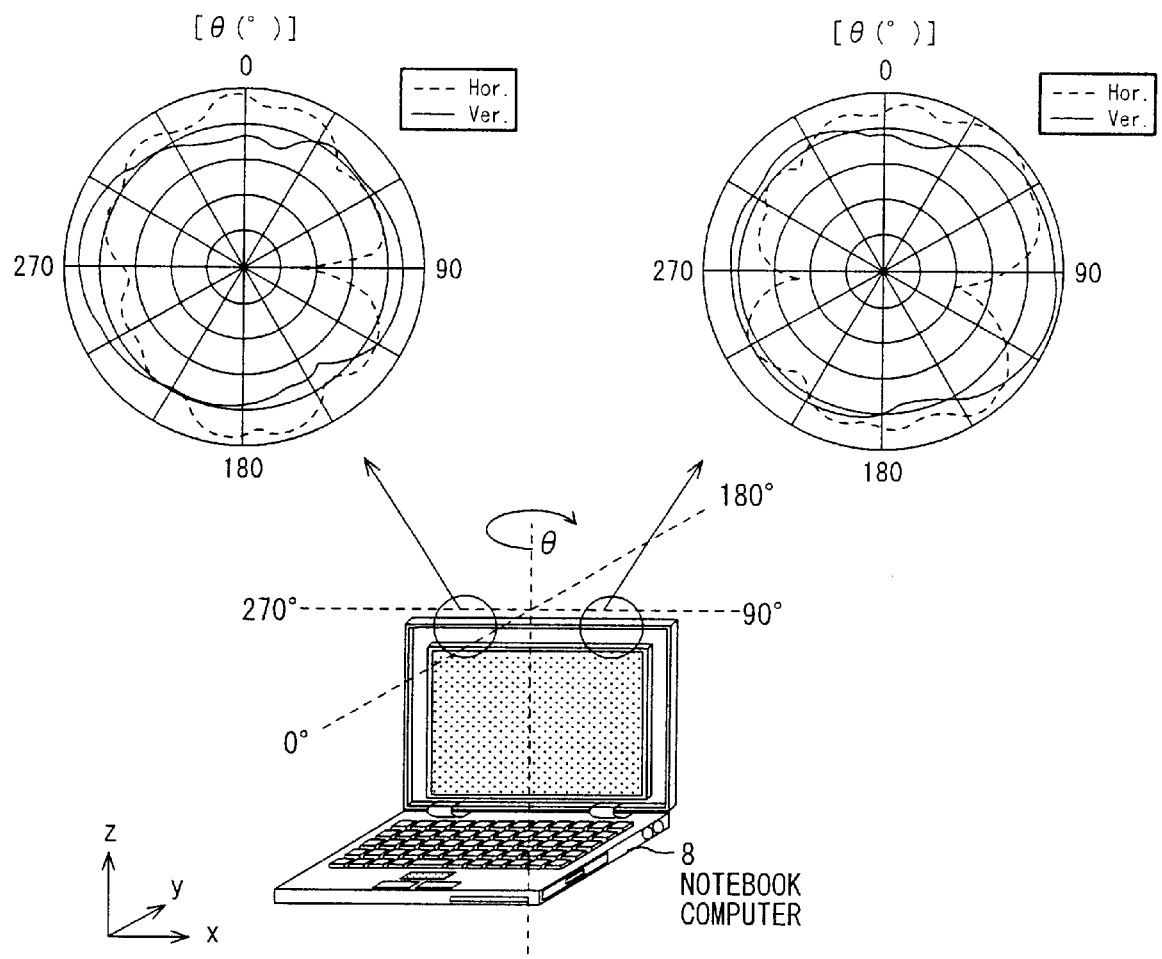
FIG. 16 shows the directivity of the flat-plate antenna of the fifth example of the present invention that is housed in a typical notebook computer.

FIG. 16 shows the measures of directivities actually exhibited by the flat-plate antennas 62 according to the present invention shown in FIG. 15. Herein, the flat-plate antennas 62 are housed in the notebook computer 8 in the same manner as the flat-plate antennas of the third example. As apparent from FIG. 16, the flat-plate antennas 62 of this example exhibit excellent directivities like those of the third and fourth examples.

Sixth Embodiment

Figure 17A:
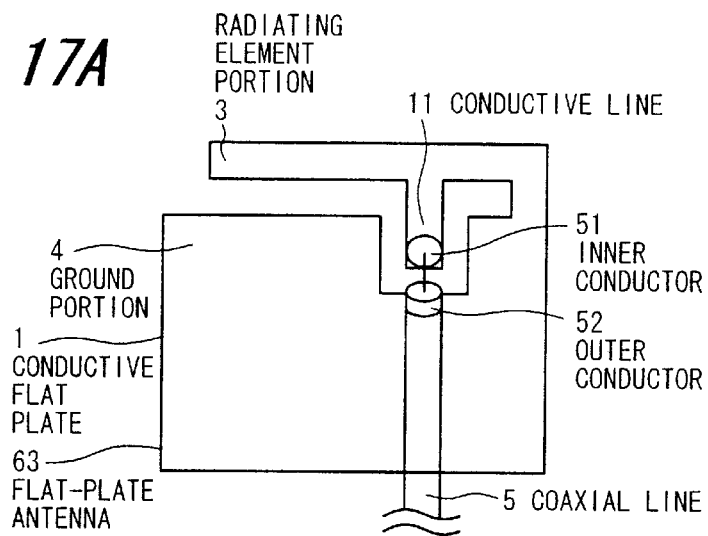
FIGS. 17(a) to 17(c) show the structures of a flat-plate antenna of a sixth example of the present invention.
Figure 17B:
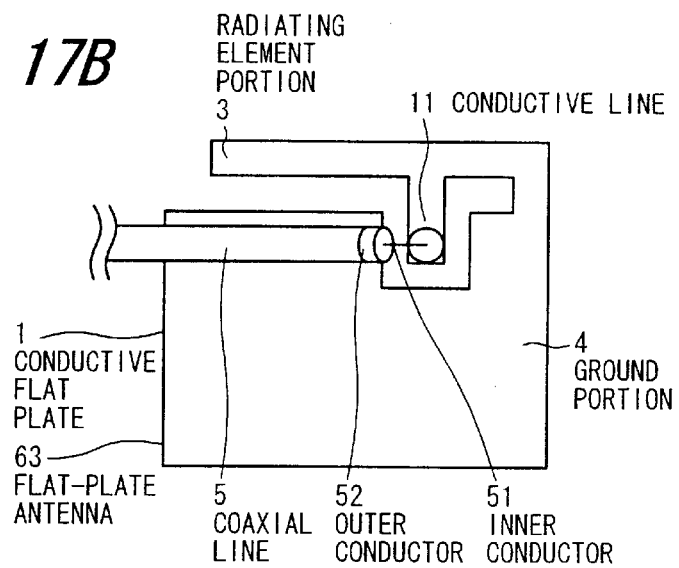
Figure 17C:
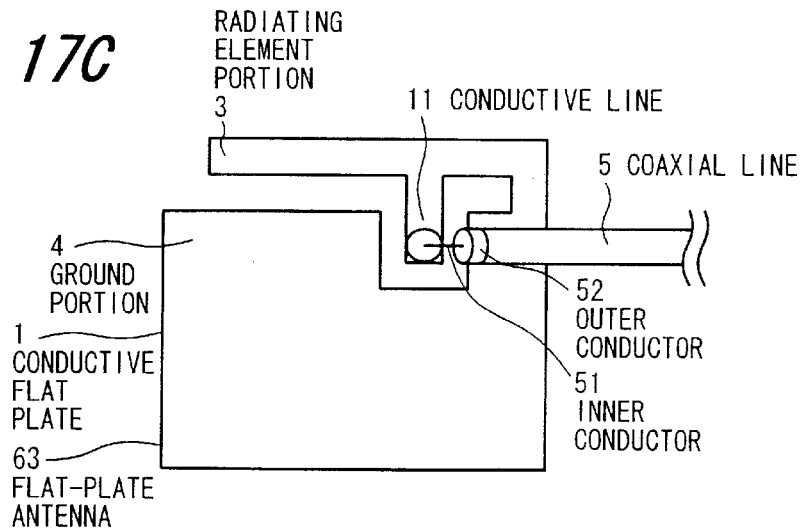

A sixth embodiment of the present invention will be described in reference to FIGS. 17(a) to 17(c). FIGS. 17(a) to 17(c) show a flat-plate antenna 63 whose power supply structure is different from the power supply structures included in the flat-plate antennas 61 of the first and second examples of the present invention. The conductive line 11 is extended from a position on the radiating element portion 3, at which an impedance match is attained, towards the ground portion 4. The inner conductor 51 included in the coaxial line 5 is coupled to the conductive line 11. A groove is formed in the ground portion 4 for fear the conductive line 11 extended from the radiating element portion 3 may come into contact with the ground portion 4. The outer conductor 52 included in the coaxial line 5 is coupled to part of the ground portion 4. Owing to this structure, the coaxial line 5 may be, as shown in FIG. 17(a), led in the direction of the length of the flat-plate antenna 63. Otherwise, the coaxial line 5 may be, as shown in FIGS. 17(b) or 17(c), led in the direction of the width of the flat-plate antenna 63. The direction in which the coaxial line 5 is led without being bend can be freely selected from a wider range of directions. Even when this example is housed in a notebook computer like the third or fourth example, this example will exhibit excellent directivity. However, the measure of the directivity is omitted.

Seventh Example

Figure 18A:
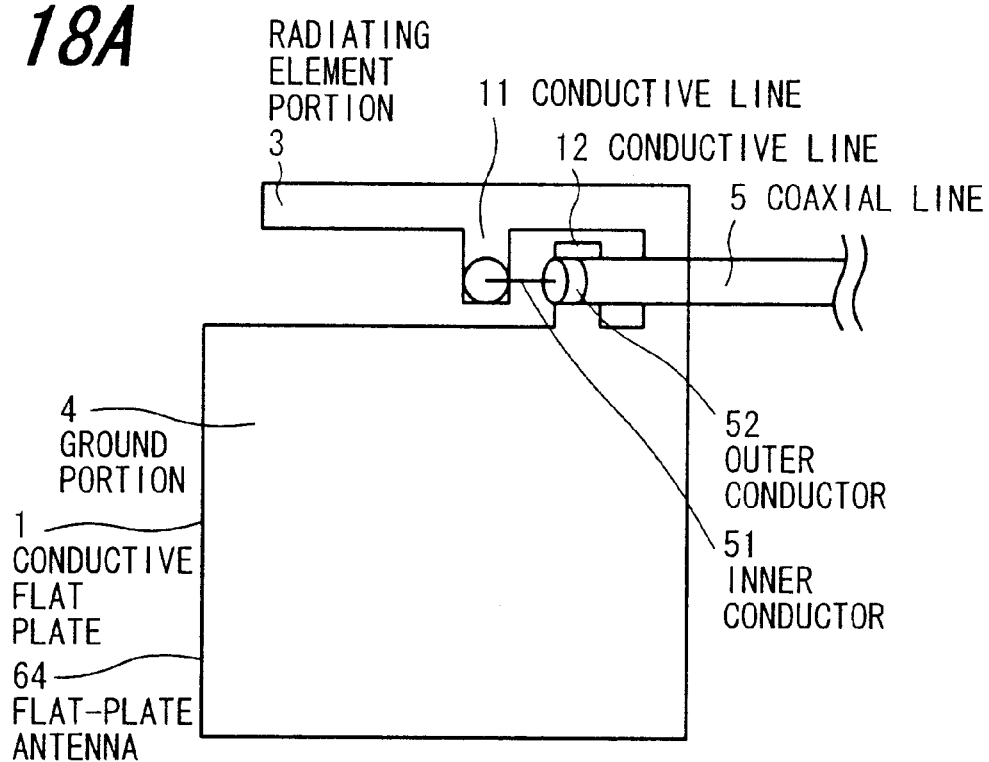
FIG. 18 shows the structure of a flat-plate antenna of a seventh example of the present invention.
Figure 18B:
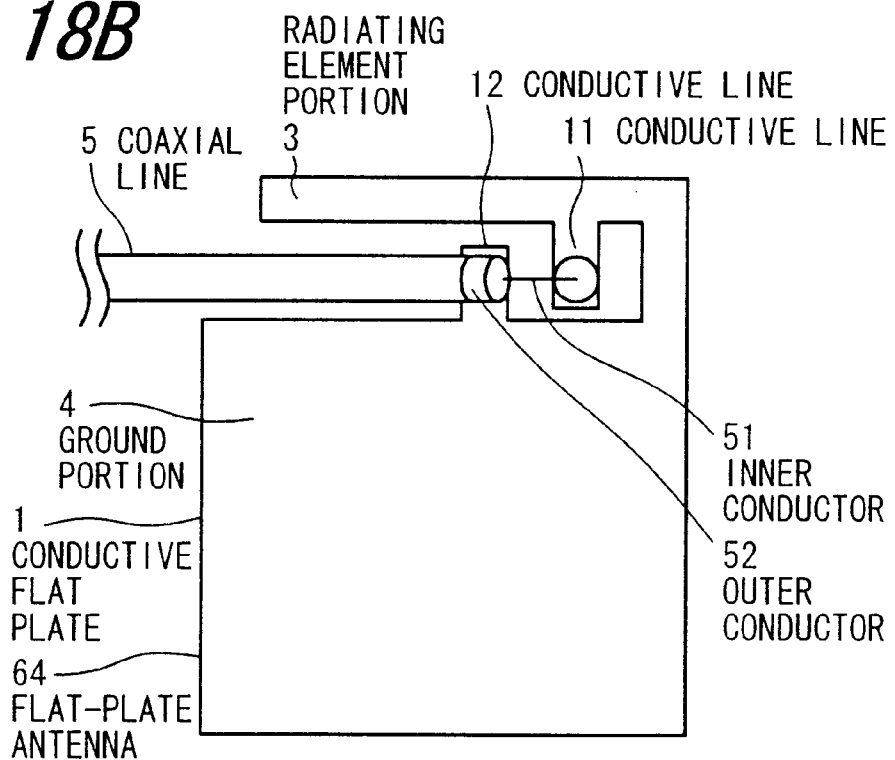

A seventh example of the present invention will be described in reference to FIG. 18. FIG. 18 shows a flat-plate antenna 64 whose power supply structure is different from those of the flat-plate antennas 61 of the first and second examples. Specifically, the conductive line 11 is extended from a position on the radiating element portion 3, at which an impedance match is attained, towards the ground portion 4. The conductive line 12 is extended from a position on the ground portion 4, at which an impedance match is attained, towards the radiating element portion 3. The inner conductor 51 included in the coaxial line 5 is coupled to the conductive line 11 extended from the radiating element portion 3. The outer conductor 52 included in the coaxial line 5 is coupled to the conductive line 12 extended from the ground portion 4. Owing to this structure, the coaxial line 5 can be led in the direction of the width of the flat-plate antenna 64 without being bent. Similarly to the third and fourth examples, this example may be housed in a notebook computer. Even in this case, this example exhibits excellent directivity. The measure of the directivity is omitted.

Eighth Example

Figure 19:
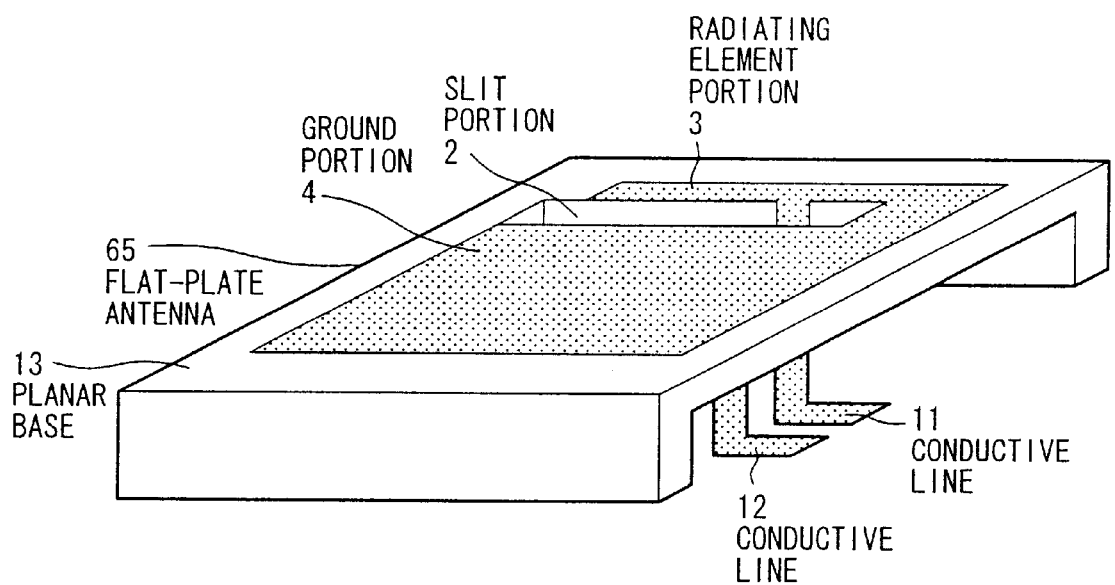
FIG. 19 is a perspective view of a flat-plate antenna of an eighth example of the present invention.

An eighth example of the present invention will be described in reference to FIG. 19. FIG. 19 shows a flat-plate antenna 65 according to the present invention whose power supply structure is different from the ones of the flat-plate antennas 61 of the first and second examples. In addition, the flat-plate antenna 65 is formed on a planar base 13. The flat-plate antenna 65 is formed according to a method of plating the base 13 or any other machining method. The base 13 has a hole that serves as the slit portion 2 of the flat-plate antenna 65. The conductive line 11 is extended from a position on the radiating element portion 3, at which an impedance match is attained, to beneath the base 13. The conductive line 12 is extended from a position on the ground portion, at which an impedance match is attained, to beneath the base 13. This power supply structure enables power supply from beneath the base. This structure makes it possible to fix the flat-plate antenna to a portable telephone or any specific place. The base 13 is made of an insulating material. The insulating material (dielectric constant) should preferably be determined in compliance with the tendency toward the small size of the flat-plate antenna 65. Moreover, a wiring pattern drawn on a substrate may be adopted as a power line over which power is supplied to the flat-plate antenna 65. In this case, the base 13 is mounted on the substrate and the wiring pattern is connected to the conductive lines 11 and 12.

Ninth Example

Figure 20A:
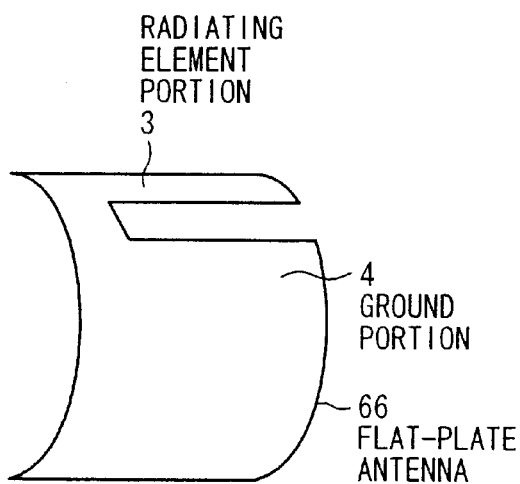
FIGS. 20(a) and 20(b) are perspective views of flat-plate antennas of a ninth example of the present invention.
Figure 20B:
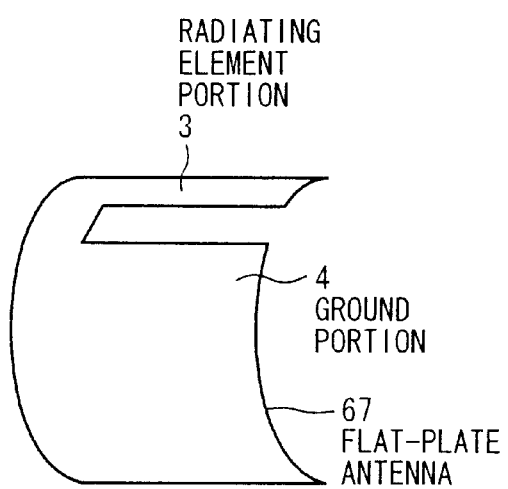

A ninth example of the present invention will be described in reference to FIGS. 20(a) and 20(b). FIGS. 20(a) and 20(b) show flat-plate antennas 66 and 67 whose conductive flat plates have three-dimensional shapes that are matched with the shapes or situations of installed positions at which the flat-plate antennas 66 and 67 are installed. Both the radiating element portion 3 and ground portion 4 of each of the flat-plate antennas 66 and 67 are machined, and the conductive flat plate thereof is entirely curved.

Tenth Example

Figure 21A:
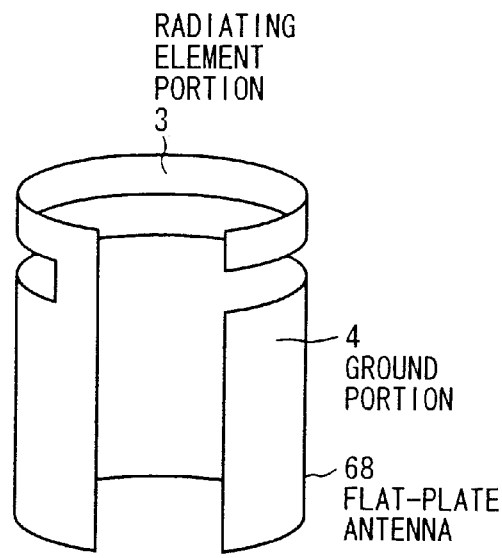
FIGS. 21(a) and 21(b) are perspective views of flat-plate antennas of a tenth example of the present invention.
Figure 21B:
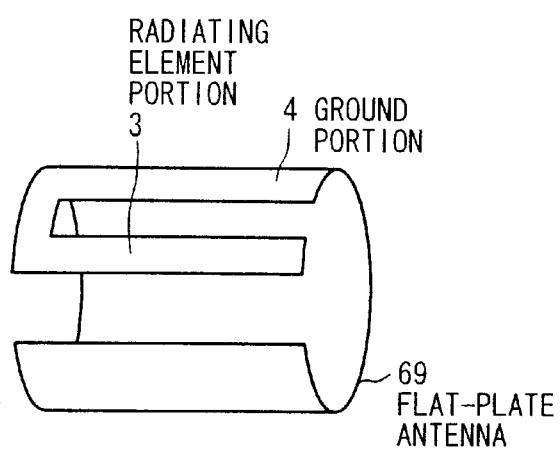

A tenth example of the present invention will be described in reference to FIGS. 21(a) and 21(b). FIGS. 21(a) and 21(b) show flat-plate antennas 68 and 69 whose conductive flat plates have three-dimensional shapes that are matched with the shapes or situations of the installed positions of the flat-plate antennas. Both the radiating element portion 3 and ground portion 4 of each of the flat-plate antennas 68 and 69 are machined, and the conductive flat plate thereof is shaped cylindrically. The flat-plate antenna 68 shown in FIG. 21(a) is curved in a direction of the length of the radiating element portion 3 (that is, in the direction of the width of the ground portion 4). The flat-plate antenna 69 shown in FIG. 21B is curved in the direction of the length of the conductive flat plate thereof.

Eleventh Example

Figure 22A:
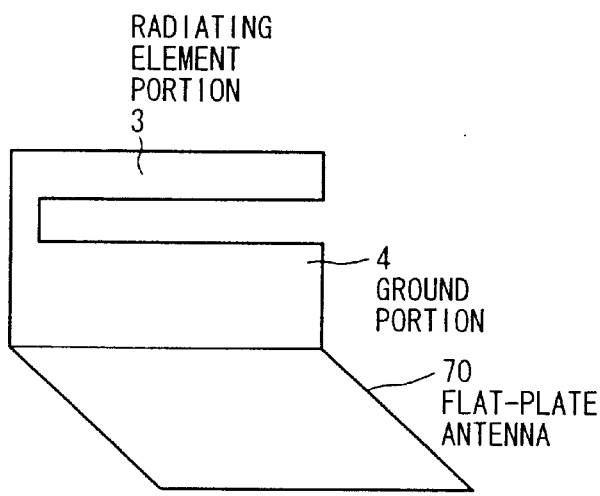
FIGS. 22(a) and 22(b) are perspective views of flat-plate antennas of an eleventh example of the present invention.
Figure 22B:
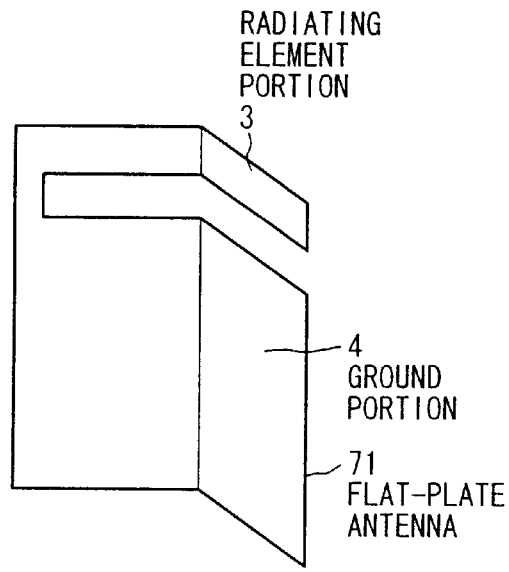

An eleventh example of the present invention will be described in reference to FIGS. 22(a) and 22(b). FIGS. 22(a) and 22(b) show flat-plate antennas 70 and 71 whose conductive flat plates have three-dimensional shapes that are matched with the shapes or situations of the installed positions of the flat-plate antennas. The flat-plate antenna shown in FIG. 22(a) is bent to have one bend in the direction of the width of the ground portion 4. The flat-plate antenna 71 shown in FIG. 22(b) has the radiating element portion 3 and ground portion 4 thereof bent so as to have one bend in the direction of the length of the conductive flat plate thereof.

Twelfth Example

A twelfth example of the present invention will be described in reference to FIGS. 23(a) to 23(d). FIGS. 23(a) to 23(d) show flat-plate antennas 72 to 75 whose conductive flat plates have three-dimensional shapes that are matched with the shapes or situations of the installed positions of the flat-plate antennas. The flat-plate antenna 72 shown in FIG.

Figure 23A:
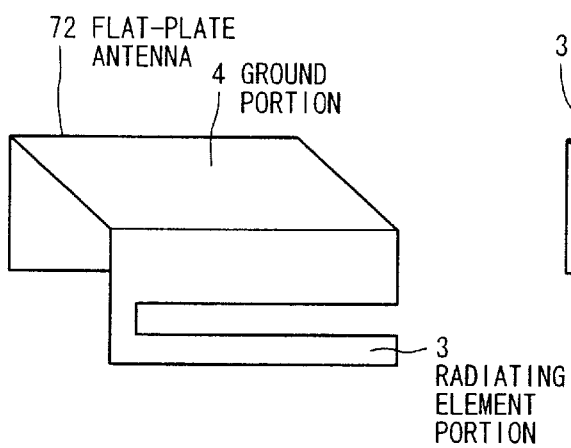
FIGS. 23(a) to 23(d) are perspective views of flat-plate antennas of a twelfth example of the present invention.
Figure 23B:
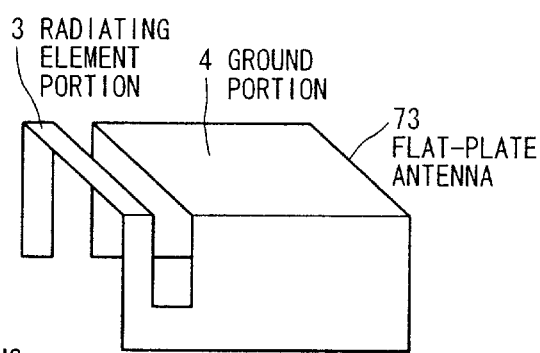
Figure 23C:
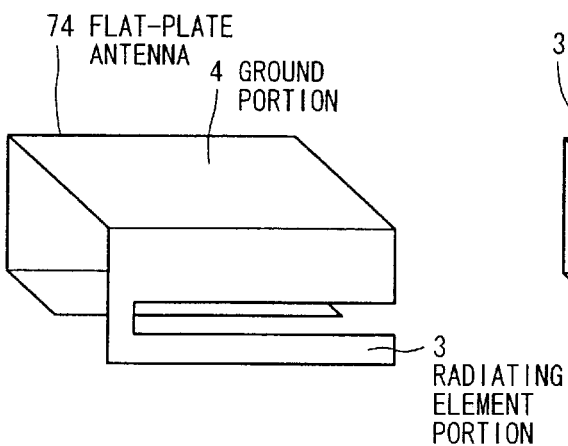
Figure 23D:
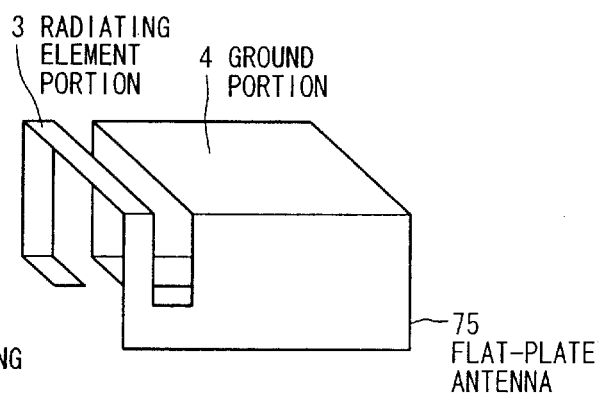

23(a) is bent to have two bends in the direction of the width of the ground portion 4. The flat-plate antenna 73 shown in FIG. 23(b) has the radiating element portion 3 and ground portion 4 thereof bent along two lines so as to have two bends in the direction of the length of the conductive flat plate thereof. The flat-plate antenna 74 shown in FIG. 23(c) is bend to have three bends in the direction of the width of the ground portion 4. The flat-plate antenna 75 shown in FIG. 23(d) has the radiating element portion 3 and ground portion 4 thereof bent along three lines so as to have three bends in the direction of the length of the conductive flat plate thereof.

Thirteenth Example

Figure 24A:
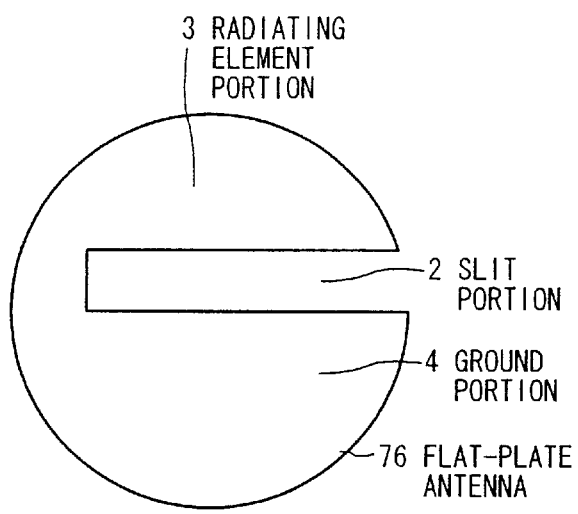
FIGS. 24(a) to 24(c) show the structures of flat-plate antennas of a third example of the present invention.
Figure 24B:
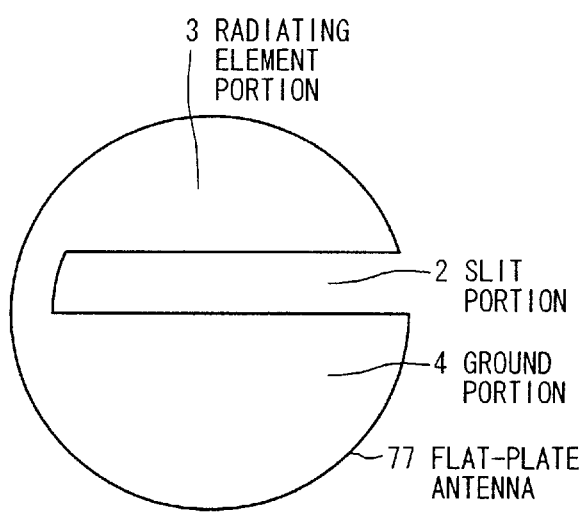
Figure 24C:
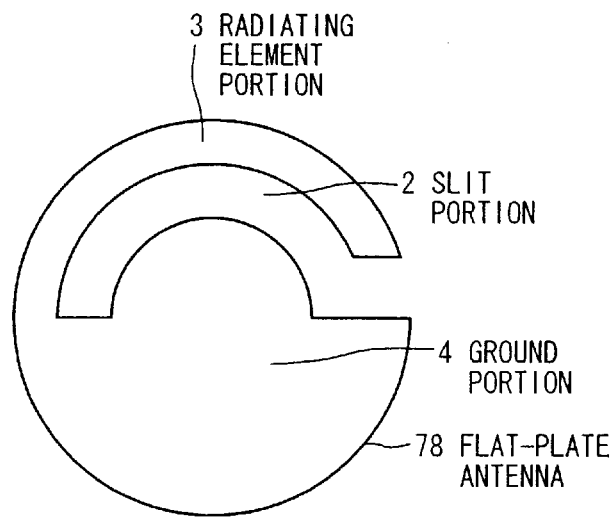

A thirteenth example of the present invention will be described in reference to FIGS. 24(a) to 24(c). FIGS. 24(a) to 24(c) show round flat-plate antennas 76 to 78 whose round conductive flat plates have different shapes that are matched with the shapes or situations of the installed positions of the flat-plate antennas. The flat-plate antennas 76 and 77 shown in FIGS. 24(a) and 24(b) each have the slit portion 2 formed along a straight line. The flat-plate antenna 78 shown in FIG. 24(c) has the slit portion 2 formed substantially like a semicircle.

Fourteenth Example

Figure 25A:
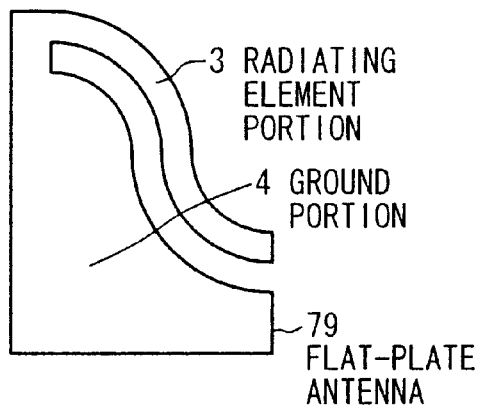
FIGS. 25(a) to 25(c) show the structures of flat-plate antennas of a fourth example of the present invention.
Figure 25B:
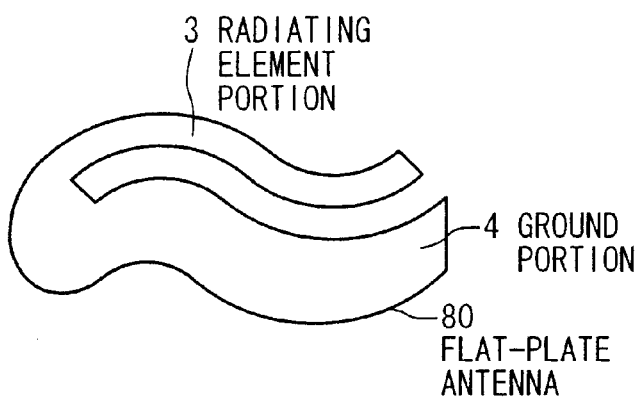
Figure 25C:
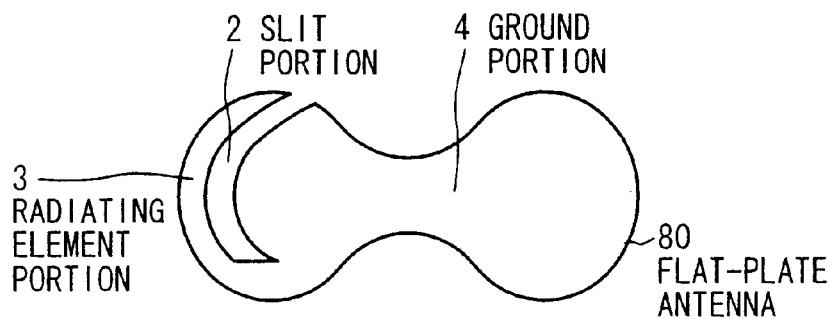

A fourteenth example of the present invention will be described in reference to FIGS. 25(a) to 25(c). FIGS. 25(a) to 25(c) show streamlined flat-plate antennas 79 to 81 whose conductive flat plates have streamlined shapes that are matched with the shapes or situation of the installed positions of the flat-plate antennas. The flat-plate antenna 79 shown in FIG. 25(a) has the radiating element portion 3 streamlined like letter S. The side of the ground portion 4 of the flat-plate antenna 79 that is opposed to the radiating element portion 3 is curved in line with the shape of the radiating element portion 3. The flat-plate antenna 80 shown in FIG. 25(b) has both the radiating element portion 3 and ground portion 4 thereof streamlined like letter S in the direction of the length of the radiating element portion 3 (that is, in the direction of the width of the ground portion 4). The flat-plate antenna 81 shown in FIG. 25(c) has the conductive flat plate thereof streamlined substantially like glasses. Moreover, the flat-plate antenna 82 has the slit portion 2 thereof streamlined.

The shape of the flat-plate antenna is not limited to the shapes of the aforesaid examples. Various shapes can be adopted according to the shape or situation of an installed position at which the flat-plate antenna is installed. Once the radiating element portion and ground portion are positioned, the conductive flat plate may have any shape. Moreover, the length of the radiating element portion is a multiple of a quarter of a wavelength attained at the operating frequency of the antenna by an odd-numbered value, but may not be equal to the width of the ground portion.

Consequently, the flat-plate antenna can be flexibly adapted to any space or any structure in which the flat-plate antenna is supposed to be placed, and can be designed compactly. Furthermore, since the flat-plate antenna may be structured freely, it can be designed to exhibit desired directivity.

Moreover, even when the flat-plate antenna has a unique shape, the dimensions of the flat-plate antenna are determined in consideration of the dielectric constants of various materials made into the housing or the like in which the flat-plate antenna is housed and the influence of the conductive components of the housing. In addition, an operating frequency at which the flat-plate antenna operates when actually housed is taken into consideration. Furthermore, the flat-plate antenna is efficiently excited.

According to a related art, an external antenna is encased in a housing separate from the housing of a portable terminal or an electric appliance included in wireless networking equipment installed at home, and connected to the portable terminal or electric appliance over a cable or the like. When the portable terminal or electric appliance must be moved, the external antenna must be dismounted from the portable terminal or electric appliance, remounted thereon, and readjusted. Besides, the external antenna may be broken.

The flat-plate antennas according to the first to fourteenth examples of the present invention obviate the necessity of dismounting, remounting, and readjusting the antenna and prevent breakage of the antenna. Furthermore, the installed position of the portable terminal or electric appliance can be freely selected from among a wide range of positions. It is unnecessary to modify the specifications for the housing of the portable terminal or electric appliance and for other various components thereof and the installed positions thereof. Incidentally, the modification leads to an increase in the cost of manufacturing and an extension of a development period. Thus, the present invention can provide a low-cost high-performance antenna that can be placed in so small a space as a gap inside a housing.

The present invention provides an excellent advantage described below.

Namely, the present invention can provide a flat-plate antenna and an electric apparatus having the flat-plate antenna. The low-cost high-performance flat-plate antenna can be placed in a small space inside a portable terminal or electric appliance or housed in a wall or the like.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching herein set forth.

What is claimed is:

1. A flat-plate antenna, comprising:
   a conductive flat plate;
   a slit, which has a specified width and specified length, formed as part of the conductive flat plate, wherein horizontal conductive portions of said flat-plate antenna are separated from each other with said slit between them and serve as a radiating element portion and a ground portion respectively;
   a separate radiating portion which is electrically formed in a direction different from the length direction of said radiating element portion so that the separate radiating portion will include, as an integral part thereof, a conductive portion linking said radiating element portion and said ground portion, wherein power is radiated from said radiating element portion and said separate radiating portion respectively, and said radiating element portion has a length and said conductive flat plate has a length which are determined so that said conductive flat plate will exhibit predetermined excitation and predetermined directivity; and
   a power line, over which power is supplied to said flat-plate antenna, in contact with said radiating element portion and said ground portion and thus electrically coupled to said radiating element portion and said ground portion.

2. The flat-plate antenna according to claim 1, wherein the length of said radiating element portion is differentiated from the width of said ground portion so that said conductive flat plate will exhibit predetermined excitation and predetermined directivity.

3. The flat-plate antenna according to claim 1, wherein the length of said radiating element portion is substantially a multiple of a quarter of a wavelength attained at the operating frequency of said flat-plate antenna by an odd-numbered value.

4. The flat-plate antenna according to claim 1, wherein a conductive line is extended from part of said radiating element portion, and the conductive line formed as an integral part of said radiating element portion is used as an integral part of the power line over which power is supplied to said flat-plate antenna.

5. The flat-plate antenna according to claim 1, wherein a conductive line is extended from part of said ground portion, and the conductive line formed as an integral part of said ground portion is used as an integral part of the power line over which power is supplied to said flat-plate antenna.

6. The flat-plate antenna according to claim 1, wherein said conductive flat plate is a conductive plane formed on an insulating base.

7. The flat-plate antenna according to claim 1, wherein said conductive flat plate has the shape thereof varied depending on the shape or situation of an installed position at which said flat-plate antenna is installed.

8. The flat-plate antenna according to claim 7, wherein said conductive flat plate has a three-dimensional shape.

9. The flat-plate antenna according to claim 7, wherein said conductive flat plate is partly or entirely streamlined.

10. The flat-plate antenna according to claim 1, wherein a wiring pattern drawn on a substrate is used as the power line over which power is supplied to said flat-plate antenna, and the power line is electrically coupled to said radiating element portion and ground portion respectively.

11. The flat-plate antenna according to claim 1, wherein a coaxial line composed of an inner conductor, which is formed with a strand having a single wire or a plurality of wires, and an outer conductor mounted on the periphery of the inner conductor is used as the power line over which power is supplied to said flat-plate antenna; and
the inner conductor and outer conductor bared at one end of the coaxial line are coupled to said radiating element portion and said ground portion respectively.

12. The flat-plate antenna, according to claim 1, wherein the power line is a coaxial line.

13. The flat-plate antenna, according to claim 1, wherein:
the horizontal conductive radiating element portion and the horizontal conductive ground portion are part of a single conductive flat plate; and
the slit is a slit in the conductive flat plate.

14. A flat-plate antenna, comprising:
a horizontal conductive radiating element portion;
a horizontal conductive ground portion;
a slit, having a width and a length, separating the horizontal conductive radiating portion and the horizontal conductive ground portion; and
a power line, configured to supply power, electrically coupled to the horizontal conductive radiating element portion and the horizontal conductive ground portion by direct physical contact with the horizontal conductive radiating element portion and the horizontal conductive ground portion.

15. The flat-plate antenna, according to claim 14, further comprising:
a separate conductive radiating element portion linking the horizontal conductive radiating element portion and the horizontal conductive ground portion, wherein power is radiated from both the separate conductive radiating element portion and the horizontal conductive radiating element portion, respectively.

16. The flat-plate antenna, according to claim 15, wherein:
the horizontal conductive radiating element portion, the horizontal conductive ground portion, and the separate conductive radiating element portion form a conductive flat plate; and
an excitation and directivity of the flat plate antenna is varied by varying a relationship between a length of the horizontal conductive radiating element portion in a first direction and a length of the conductive flat plate in a second direction, different than the first direction.

* * * * *